J. B. CROFOOT

May 27, 1930. CUSHION CAP FOR TOOLS Re. 17,684

Original Filed March 16, 1928

Witnesses:
K. W. Fischer
F. C. Appleton

Inventor
John B. Crofoot
By: Joshua R. H. Fox
His Attorney

Reissued May 27, 1930

Re. 17,684

UNITED STATES PATENT OFFICE

JOHN B. CROFOOT, OF MOUNT PROSPECT, ILLINOIS

CUSHION CAP FOR TOOLS

Original No. 1,713,820, dated May 21, 1929, Serial No. 262,255, filed March 16, 1928. Application for reissue filed March 31, 1930. Serial No. 440,564

The present invention is directed to improvements in cushion caps for percussion operated tools such as stapling machines and the like, and has for its general object the provision of a device of the kind described that will be efficient in operation, of comparatively low manufacturing cost and particularly adapted to save the hand of the operator from pain or discomfort when operating the device.

Another object of my invention is to provide a cushion cap for stapling machines with means permitting its almost continuous use without injury to the comparatively soft hands of those engaged in office work.

Other objects and advantages of my invention will appear more fully hereinafter when taken in connection with the accompanying drawings, in which.

Figure 1:
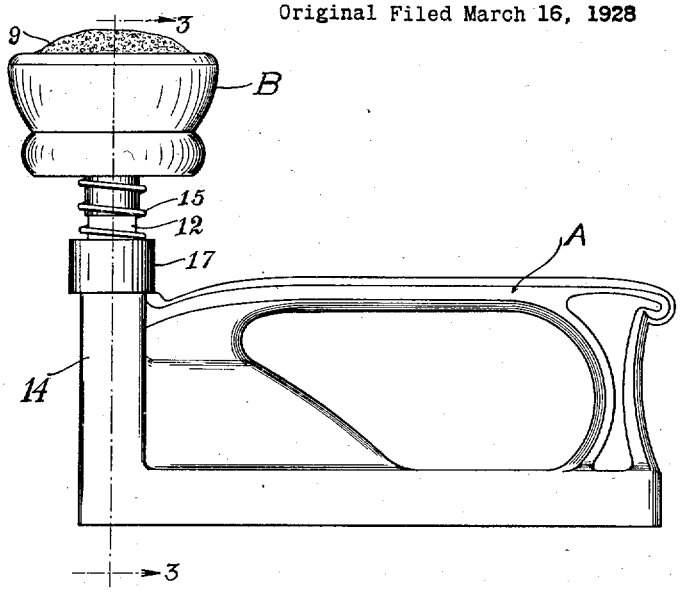
Figure 1 is a side elevation of my device as applied to a conventional stapling machine.
Figure 2:
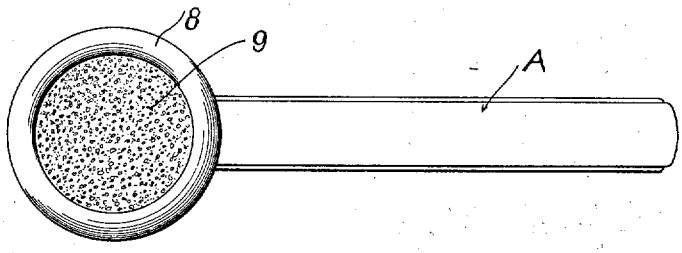
Figure 2 is a plan view thereof.

Referring more particularly to the drawings in which similar characters of reference designate corresponding parts in the several views, A designates a stapling machine having an operating head 6 to which is applied the cushion cap B embodying my invention. The cap B comprising my structure is formed of soft, pliable rubber molded to provide an upper cup shaped recess 7, formed by the circumferential wall 7′ having an overlapping flange or lip 8 adapted to aid in securing the rubber sponge 9. Formed unitary with the cap and on the bottom thereof is a comparatively shallow cup shaped recess 10, the walls 11 of which are likewise adapted to overlap and secure the operating head 6 which latter forms a part of the plunger hammer 12, this element being square in configuration to register with and be slidably received by a square groove 13 in an end wall 14 of the stapling machine A.

Figure 3:
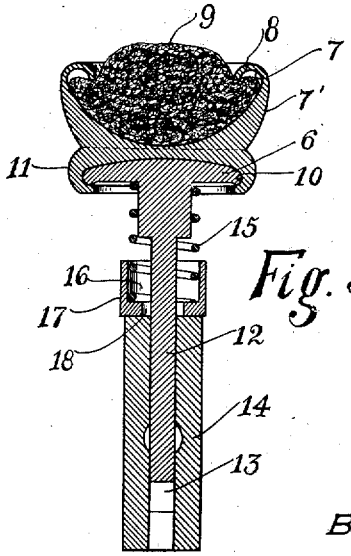
Figure 3 is a sectional view taken on line 3—3 of Figure 1 looking in the direction of the arrows.

As best shown in Figure 3, it will be seen that the operating handle 6 is resiliently maintained in raised position to be operated by the action of coil spring 15, which latter is seated in a recess 16 of a collar 17 having a bottom hole 18 accommodating the square shank 12. It will be understood, that the details of the stapling machine in themselves form no part of my invention, but are merely set forth with a view to a more clear explanation of the functions and mode of operation of my cushion cap B.

The operation of stapling machines is, of course, well known, it being understood that a supply of staples is sequentially fed to the plunger hammer 12 as the latter applies them individually to the various papers and documents to be attached or stapled together.

When stapling machines are used over protracted intervals of time, it is often found that the hand of the operator is rendered painful, by reason of the constant blows delivered, sometimes giving rise to injury of the small bones of the hand. In this respect, I have found the rubber sponge 9 to form an admirable cushioning agent in conjunction with the pliable and resilient wall 7′ which serves to partially enclose the sponge 9. The properties of the rubber sponge are of course too well known to need description. The softness and pliancy of this product particularly suits it for use as a shock absorbing medium in the capacity above indicated.

By actual experience, I have found no tendency towards lameness of the hand of those constantly engaged in manipulation of stapling machines when my cushion cap has been applied to the heads of these devices.

It will be understood, of course, that minor changes of construction and relative disposition of parts may be made without departing from the spirit or scope of my invention as illustrated in the drawings and set forth in the specification; hence, I do not confine myself literally to the exact details as described, but wish to avail myself of such variations and modifications as fairly lie within the province of the appended claims.

What I claim as new and desire to secure by Letters Patent is:

1. A rubber cushion cap comprising a unitary pliable structure having a bottom socket adapted to clampingly receive the head of a stapling machine, a top socket, a resilient shock absorbing porous element in said top socket, and a flange on the wall of said top socket whereby said porous element is removably secured thereto.

2. A cushion cap comprising a unitary rubber structure having a bottom socket formed by a downwardly and inwardly projecting circumferential wall, a top socket formed by an upper and inwardly projecting circumferential wall, said bottom socket arranged to clampingly receive the operating head of a stapling machine, and a rubber sponge removably secured in said top socket.

3. A cushion cap comprising a unitary pliable structure having a bottom socket adapted to clampingly receive the head of a stapling machine, a top socket formed in said cushion cap, a resilient shock absorbing porous element disposed in said top socket, and means for retaining said porous element in said top socket.

4. A cushion cap comprising a unitary pliable structure provided with means for engaging the operating head of a stapling machine, said structure provided with an upper socket oppositely disposed to the stapling machine head engaging portion, a shock absorbing element of greater resiliency and pliability than said structure disposed in said upper socket, and means for retaining said element within said socket.

In testimony whereof I have signed my name to this specification.

JOHN B. CROFOOT.